(12) United States Patent
Thiyagarajan et al.

(10) Patent No.: US 8,549,865 B2
(45) Date of Patent: Oct. 8, 2013

(54) PRESSURE-ACTUATED PLUG

(75) Inventors: Manikandan Thiyagarajan, Tiruchirappalli (IN); Anantha Ramesh Rangaswamy, Bangalore (IN); Pugalenthi Nanda Gopal, Cumbum (IN)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 12/849,184

(22) Filed: Aug. 3, 2010

(65) Prior Publication Data

US 2012/0031105 A1 Feb. 9, 2012

(51) Int. Cl.
*F02C 6/08* (2006.01)

(52) U.S. Cl.
USPC .......................................... 60/782

(58) Field of Classification Search
USPC ............ 60/782, 785, 39.23; 137/505.13, 505, 137/494; 415/114–117; 416/97 R
See application file for complete search history.

(56) References Cited

U.S. PATENT DOCUMENTS

| | | | | |
|---|---|---|---|---|
| 866,503 | A | * | 9/1907 | Morehart ................. 137/505.13 |
| 1,196,121 | A | * | 8/1916 | Larsen .............................. 417/17 |
| 1,230,981 | A | * | 6/1917 | Bacon ............................ 137/224 |
| 3,670,771 | A | | 6/1972 | Dewberry |
| 4,296,599 | A | * | 10/1981 | Adamson ..................... 60/39.23 |
| 4,416,111 | A | * | 11/1983 | Lenahan et al. ................ 60/795 |
| 4,807,433 | A | * | 2/1989 | Maclin et al. ................... 60/795 |
| 4,893,650 | A | | 1/1990 | Chisholm et al. |
| 5,996,331 | A | * | 12/1999 | Palmer ............................ 60/782 |
| 6,402,052 | B1 | | 6/2002 | Murawa |
| 6,931,859 | B2 | | 8/2005 | Morgan et al. |
| 2010/0083667 | A1 | * | 4/2010 | Franconi ......................... 60/795 |
| 2010/0175387 | A1 | * | 7/2010 | Foust et al. ..................... 60/782 |

* cited by examiner

*Primary Examiner* — Phutthiwat Wongwian
*Assistant Examiner* — William Breazeal
(74) *Attorney, Agent, or Firm* — Dority & Manning, PA

(57) ABSTRACT

A plug for regulating a flow of gas in a system is disclosed. The plug includes a housing disposed on a temperature boundary in a system. The housing defines a passage for flowing gas therethrough. The plug further includes at least one pressure-actuated valve disposed in the passage and movable between an open position and a closed position. The at least one pressure-actuated valve moves from the open position to the closed position as the pressure of the gas increases and moves from the closed position to the open position as the pressure of the gas decreases.

12 Claims, 4 Drawing Sheets

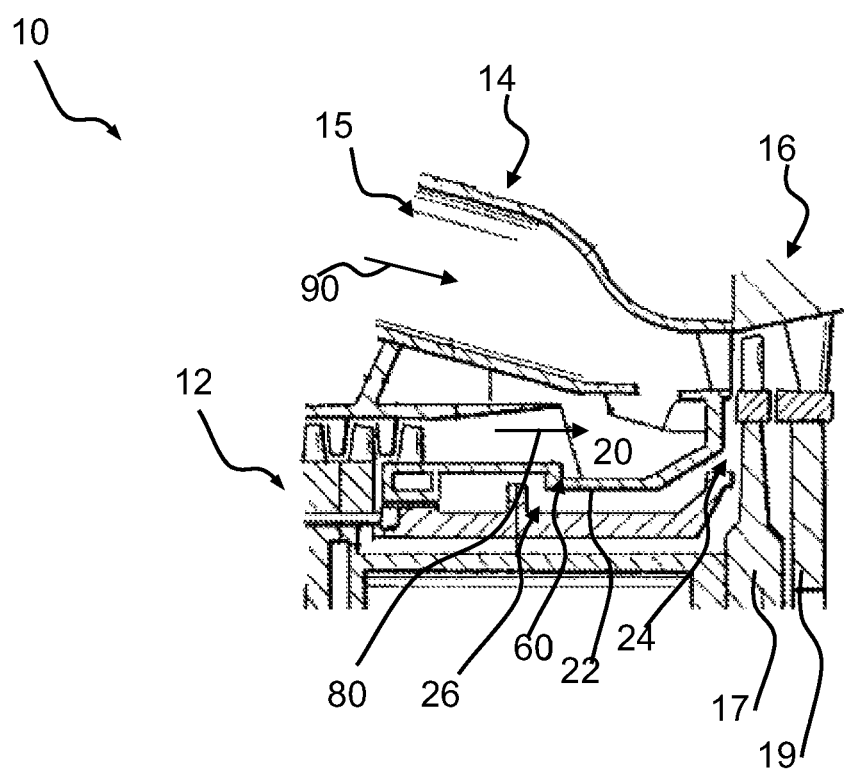
FIG. -1-

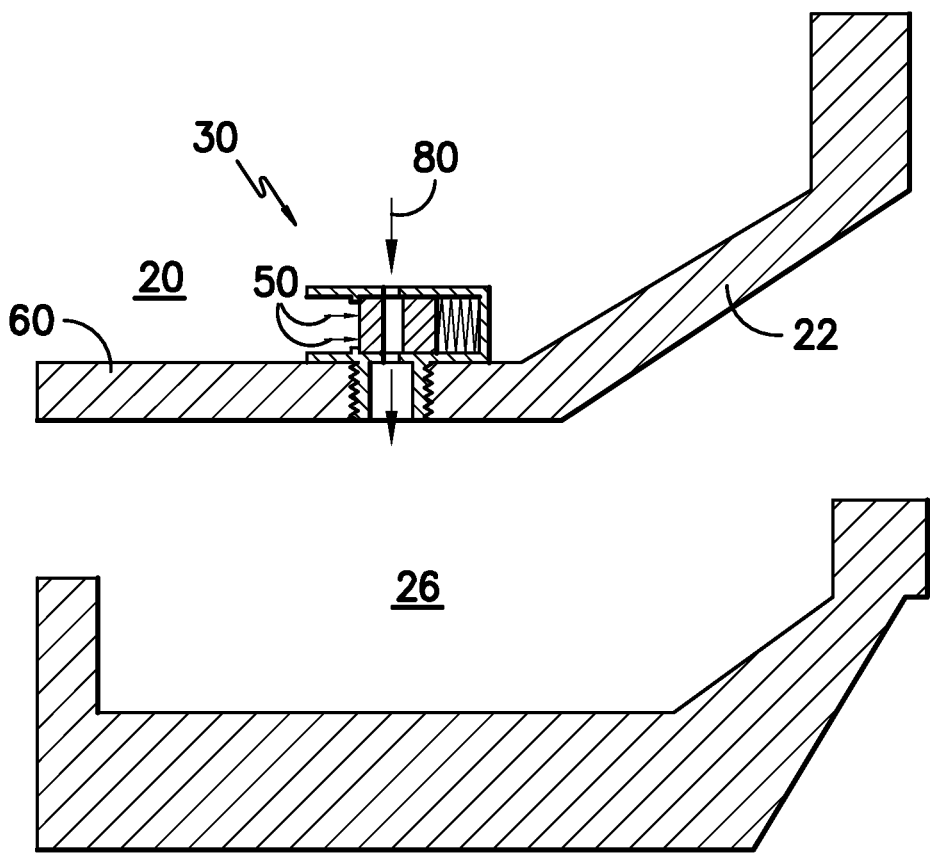
FIG. -2-

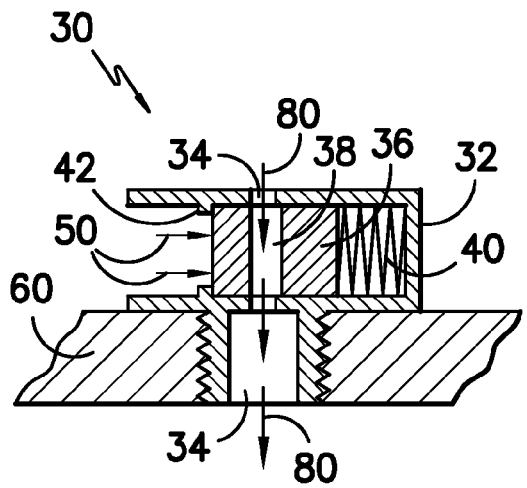
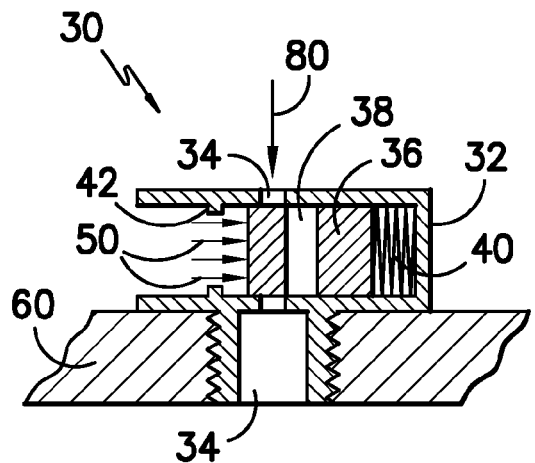
FIG. -3-
FIG. -4-
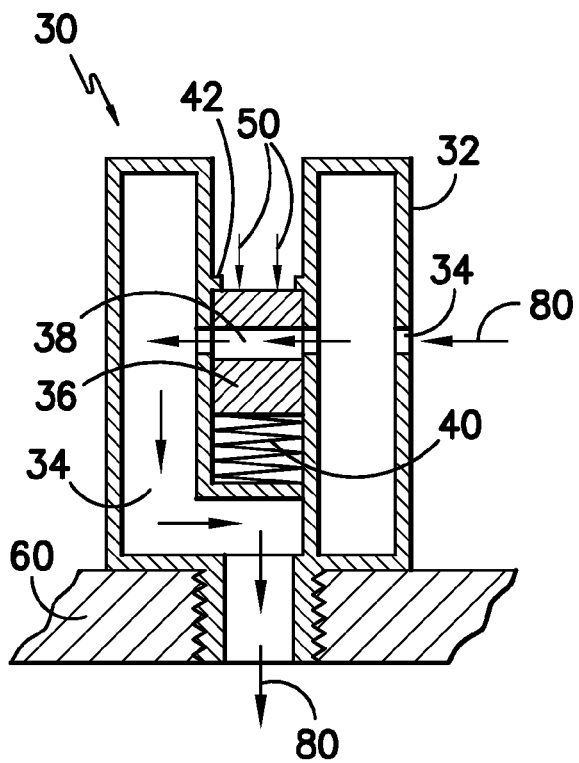
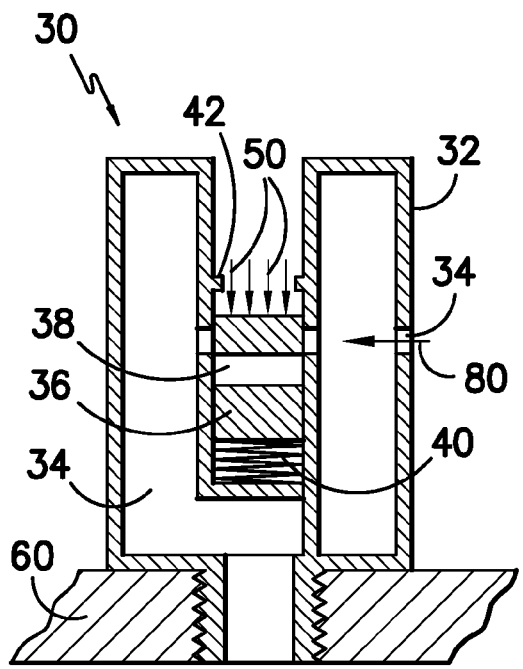
FIG. -5-
FIG. -6-

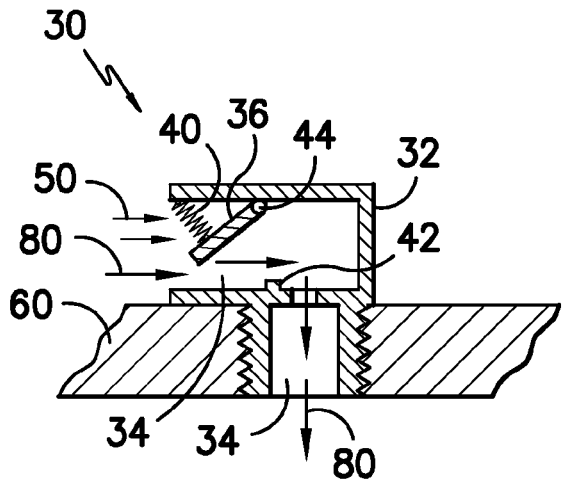
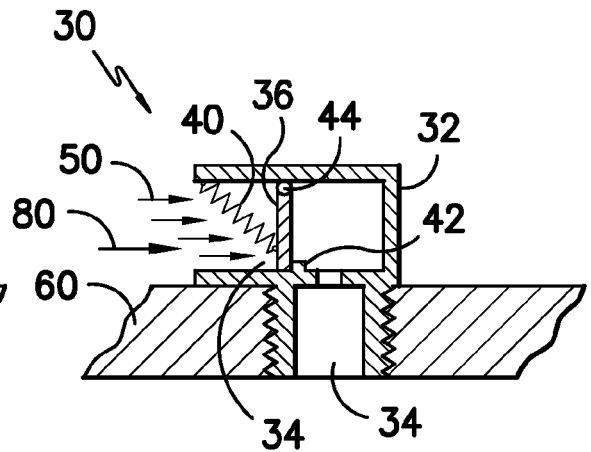
FIG. -7-
FIG. -8-
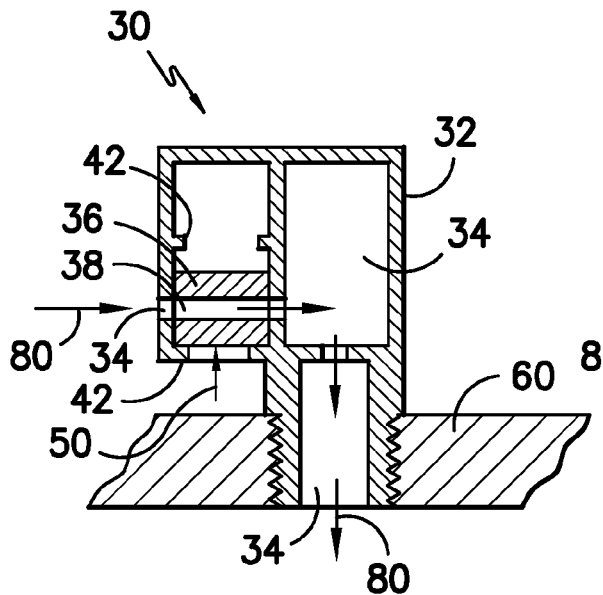
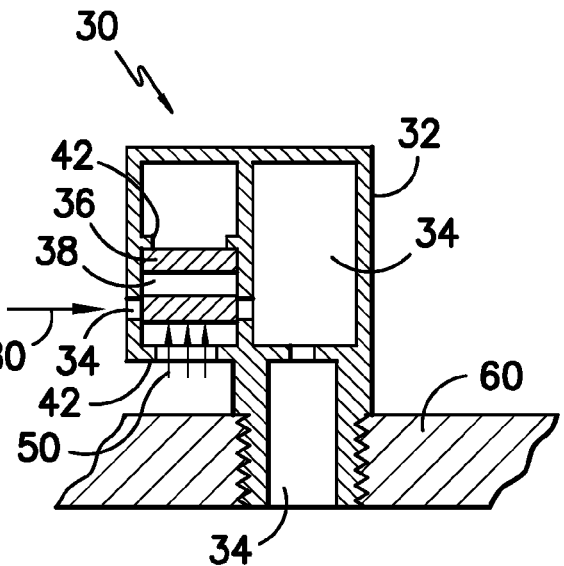
FIG. -9-
FIG. -10-

PRESSURE-ACTUATED PLUG

FIELD OF THE INVENTION

The subject matter disclosed herein relates generally to gas turbines, and more particularly to apparatus and methods for selectively cooling high temperature areas in gas turbines.

BACKGROUND OF THE INVENTION

Gas turbine systems are widely utilized in fields such as power generation. A conventional gas turbine system includes a compressor section, a combustor section, and a turbine section. The compressor section supplies compressed air to the combustor section, wherein the compressed air is mixed with fuel and burned, generating a hot gas. This hot gas is supplied to the turbine section, wherein energy is extracted from the hot gas to produce work.

During operation of the gas turbine system, various components and areas in the system are subjected to high temperature flows, which can cause the components and areas to fail. Since higher temperature flows generally result in increased performance, efficiency, and power output of the gas turbine system and are thus desired in the gas turbine system, the components and areas that are subjected to high temperature flows must be cooled to allow the gas turbine system to operate with flows at increased temperatures.

One example of an area that should be cooled is the wheel space of the turbine section. The wheel space is generally the area of the turbine section surrounding the turbine rotor wheels. As the temperature in the wheel space increases due to increased temperature of flows through the wheel space or due to increased ambient temperatures external to the gas turbine system, components in the wheel space, such as rotor and bucket assembly components, may be subject to thermal expansion. This thermal expansion may eventually cause the various components to rub or otherwise contact each other, potentially resulting in catastrophic damage to the components and to the gas turbine system.

Various strategies are known in the art for cooling the wheel space to prevent damage to the wheel space components. For example, one solution utilizes a portion of the air exiting the compressor section of the gas turbine system to cool the wheel space. Bores are created in the compressor discharge case, which defines and separates the compressor discharge plenum and the forward portion of the wheel space. The bores are then plugged with bore plugs. When the temperature in the wheel space approaches an unacceptably high temperature, the bore plugs are removed, and a portion of the air from the compressor section is provided through the bores to the wheel space, cooling the wheel space.

However, this strategy for cooling the wheel space has potential drawbacks. For example, after the bore plugs have been removed, they cannot be replaced until the gas turbine system has been completely shut down. Thus, air from the compressor section will be constantly supplied to the wheel space after the bore plugs are removed until the gas turbine is shut down. In many cases, however, the wheel space may not require this constant cooling. For example, in many cases, wheel space temperature variations are caused by variations in the ambient temperature external to the gas turbine system. When the ambient temperature is relatively hot, such as during the afternoon or during the summer months, the wheel space may require cooling, but when the ambient temperature is relatively cool, such as during the evening or during the winter months, the wheel space may not require cooling. Thus, after the bore plugs have been removed and when the ambient temperature is relatively cool, air from the compressor section is unnecessarily diverted to the wheel space. This unnecessary diversion of compressed air may result in losses in the power generation and efficiency of the gas turbine system.

Accordingly, an apparatus and method for providing cooling air to high temperature gas turbine system areas and components would be desired in the art. For example, an apparatus and method that provides cooling air to the areas and components only as required, such as during relatively higher temperature operating conditions, would be advantageous.

BRIEF DESCRIPTION OF THE INVENTION

Aspects and advantages of the invention will be set forth in part in the following description, or may be obvious from the description, or may be learned through practice of the invention.

In one embodiment, a plug for regulating a flow of gas in a system is disclosed. The plug includes a housing disposed on a temperature boundary in a system. The housing defines a passage for flowing gas therethrough. The plug further includes at least one pressure-actuated valve disposed in the passage and movable between an open position and a closed position. The at least one pressure-actuated valve moves from the open position to the closed position as the pressure of the gas increases and moves from the closed position to the open position as the pressure of the gas decreases.

In another embodiment, a method for regulating a flow of gas in a system is disclosed. The method includes providing at least one plug, actuating the valve towards an open position to allow the gas to flow therethrough when the pressure of the gas decreases, and actuating the valve towards a closed position to prevent the gas from flowing therethrough when the pressure of the gas increases. The plug includes a housing disposed on a temperature boundary in a system, the housing defining a passage for flowing gas therethrough, and at least one pressure-actuated valve disposed in the passage and movable between an open position and a closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional view of a portion of a gas turbine system of the present disclosure;

FIG. 2 is a cross-sectional view of one embodiment of a temperature boundary with a plug disposed thereon of the present disclosure;

FIG. 3 is a cross-sectional view of one embodiment of the plug of the present disclosure in an open position;

FIG. 4 is a cross-sectional view of the plug of FIG. 3 in a closed position;

FIG. 5 is a cross-sectional view of another embodiment of the plug of the present disclosure in an open position;

FIG. 6 is a cross-sectional view of the plug of FIG. 5 in a closed position;

FIG. 7 is a cross-sectional view of another embodiment of the plug of the present disclosure in an open position;

FIG. 8 is a cross-sectional view of the plug of FIG. 7 in a closed position;

FIG. 9 is a cross-sectional view of yet another embodiment of the plug of the present disclosure in an open position; and FIG. 10 is a cross-sectional view of the plug of FIG. 9 in a closed position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 shows a cross-sectional view of a portion of a gas turbine system 10. The system 10 may include a compressor section 12, a combustor section 14, and a turbine section 16. Further, the system 10 may include a plurality of compressor sections 12, combustor sections 14, and turbine sections 16. The compressor section 12 and turbine section 16 may be coupled by a shaft (not shown). The shaft may be a single shaft or a plurality of shaft segments coupled together to form a shaft.

The compressor section 12 may compress a gas 80 as the gas 80 flows through the compressor section 12. The gas 80 may be, for example, air or any other suitable gas. The compressor section 12 may then flow the gas 80 to the combustor section 14, which may be configured to accept the gas 80 as is generally known in the art. For example, the compressor section 12 may include a compressor discharge plenum 20 at least partially defined by a compressor discharge case 22. Compressed gas 80 discharged from the compressor section 12 may flow through the compressor discharge plenum 20 and into to the combustor section 14, which is generally characterized by a plurality of combustors 15 disposed in an annular array (only one of which is illustrated in FIG. 1). The compressed gas 80, after flowing into the combustor section 14, may be combusted, generally after being mixed with fuel, thus generating a hot gas 90.

The resulting hot gas 90 may flow from the combustor section 14 into the turbine section 16, which may be configured to accept the hot gas 90 as is generally known in the art to drive the gas turbine system 10 and generate power. The turbine section 16 may include a plurality of rotor wheels 17 disposed in a turbine wheel space 24. The rotor wheels may be mounted to the shaft in annular arrays, thus forming turbine rotors (not shown). The turbine section 16 may also include a plurality of annularly disposed stator components 19 in the turbine wheel space 24. The wheel space 24 may further include forward wheel space 26. The forward wheel space 26 may be at least partially defined by the compressor discharge case 22.

Numerous temperature boundaries 60 exist within the different sections of the gas turbine system 10. As used herein, the term temperature boundary refers to any location wherein the temperature on one side of a stationary structure is greater than the temperature on the opposing side of such structure. These temperature boundaries also typically define locations across which pressure variations exist. It is common to locate passageways or holes, such as dilution holes or bore holes, on such temperature boundaries to allow relatively cooler, higher pressure gases on one side of the temperature boundaries to flow through the temperature boundaries and quench the relatively hotter, lower pressure areas on the opposing side of the temperature boundaries.

One example of a temperature boundary 60 is shown in FIG. 1. As shown, relatively cooler gas 80 flowing within the compressor discharge plenum 20 creates a temperature boundary 60, defined by the compressor discharge case 22, between the compressor discharge plenum 20 and the forward wheel space 26. A bore hole, or a plurality of bore holes, (not illustrated) is often provided on this temperature boundary 60 to allow a portion of the gas 80 flowing through the compressor discharge plenum 20 to enter the forward wheel space 26 to relieve high temperatures in the forward wheel space 26 and to cool the turbine wheel space 24 in general, including the rotor wheels 17, stator components 19, and other various gas turbine system 10 components.

The operating temperatures within the forward wheel space 26 can vary significantly as a result of differing operating condition temperatures and expected engine-to-engine variations, such as the amount of stage one bucket leakage or hot gas ingestion. Specifically, the operating temperatures within the forward wheel space 26 may vary according to the ambient temperature external to the gas turbine system 10. For example, when the ambient temperature is relatively hot, such as during the afternoon or during the summer months, the forward wheel space 26 may be relatively hotter, and may require cooling. When the ambient temperature is relatively cool, however, such as during the evening or during the winter months, the forward wheel space 26 may be relatively cooler, and may not require cooling. For example, the temperature of the gas 80 may range from approximately 550 degrees Fahrenheit ("° F.") to approximately 750° F., and the temperature of the forward wheel space 26 may range from approximately 650° F. to approximately 850° F., as the ambient temperature ranges from approximately −20° F. to approximately 120° F. As the ambient temperature fluctuates within this range, the temperatures of the gas 80 and the forward wheel space 26 may correspondingly fluctuate. Further, the forward wheel space 26 may require cooling as the temperature approaches a certain threshold temperature, such as approximately 800° F. It should be understood that the gas 80, forward wheel space 26, and ambient temperature are not limited to the temperatures disclosed herein, but may be any temperatures.

As such, plugs 30 may be utilized in the bore holes. The plugs 30 may advantageously be configured to provide sufficient cooling air to the forward wheel space 26 only as required, such as during relatively higher temperature operating conditions. It should be understood that the plug 30 of the present disclosure is not limited to use in a compressor discharge case 22, but rather may be used on any suitable temperature boundary 60 to provide a cooling flow as required through the temperature boundary 60. It should further be understood that the plug 30 of the present disclosure is not limited to use on a temperature boundary 60 in a gas turbine system 10, but rather may be used on any temperature boundary 60 in any suitable system.

As shown in FIG. 2, the plug 30 of the present disclosure may be utilized to regulate the flow of gas 80 through a temperature boundary 60, such as through a temperature boundary 60 in a gas turbine system 10. For example, as shown in FIG. 2, in one embodiment, the temperature boundary 60 may be defined by the compressor discharge case 22.

Further, the temperature boundary 60 may be located between the compressor discharge plenum 20 and the forward wheel space 26. The plug 30 of the present disclosure may allow gas 80 to selectively flow through the temperature boundary 60 to cool a relatively higher temperature area, as described below.

As shown in FIGS. 3 through 10, the plug 30 of the present disclosure may include a housing 32 and at least one pressure-actuated valve 36. The housing 32 may generally be disposed on the temperature boundary 60 in the gas turbine system 10, such as on the relatively lower temperature side of the temperature boundary 60. For example, the plug 30 may be disposed in a bore hole provided on the temperature boundary 60. In various embodiments, the plug 30 may include threads that mate with threads in the bore hole, or may be welded, bolted, or may be otherwise secured in the bore bole using any suitable fastening or securing techniques.

The housing 32 may define a passage 34 for flowing gas 80 therethrough. In general, the passage 34 may allow the gas 80 to flow from an area having a relatively cooler temperature through the temperature boundary 60 to an area having a relatively hotter temperature. The passage 34 may be generally straight, or may be circuitous or serpentine or have any other suitable shape. Further, the passage 34 may include multiple branches that accommodate multiple flows of gas 80. The passage 34 may have a generally circular or oval cross-section, a generally rectangular cross-section, a generally triangular cross-section, or any other suitable polygonal cross-section. The cross-sectional area of the passage 34 may be constant throughout the length of the passage 34, or may taper or have portions with varying cross-sections.

The at least one pressure-actuated valve 36 may be disposed in the passage 34, and may be movable between an open position, as shown in FIGS. 2, 3, 5, 7, and 9, and a closed position, as shown in FIGS. 4, 6, 8, and 10. In the open position, the valve 36 may allow gas 80 to flow through the passage 34, as discussed above. In the closed position, however, the valve 36 may prevent gas 80 from flowing through the passage 34.

For example, in exemplary embodiments, the valve 36 may include a valve bore 38 therethrough, as illustrated in FIGS. 2 through 6, 9, and 10 and further described below. In the open position (see FIGS. 2, 3, 5, and 9), the valve bore 38 may be aligned with the passage 34 such that gas 80 can pass through the valve bore 38 as the gas 80 is flowing through the passage 34. In the closed position (see FIGS. 4, 6, and 10), however, the valve bore 38 may be aligned with the inner walls of the passage 34, such that gas 80 in the passage 34 is prevented by the outer walls of the valve 36 from flowing through the valve bore 38 and thus through the passage 34.

In alternative exemplary embodiments, however, the valve 36 may be movable into and out of the flow path of gas 80 through the passage 34 such that a valve bore 38 is not required. For example, as illustrated in FIGS. 7 and 8 and further described below, the valve 36 in the open position (see FIG. 7) may be generally disposed proximate an inner wall of the passage 34, such that the valve 36 only minimally impedes the flow of gas 80 through the passage 34. In the closed position (see FIG. 8), however, the valve 36 may be generally disposed in the passage 34 such that the passage 34 is completely or substantially blocked, preventing gas 80 from flowing therethrough.

In general, the valve 36 of the present disclosure may be actuated by relative changes in the pressure of gas 80. The valve 36 may move from the open position to the closed position as the pressure of the gas 80 increases, and may move from the closed position to the open position as the pressure of the gas 80 decreases. For example, in the context of a gas turbine system 10, the pressure of the gas 80 may change with respect to the temperature of the gas 80 and the ambient temperature external to the gas turbine system 10. As discussed, the ambient temperature external to the gas turbine system 10 may vary between relatively hotter temperatures, such as during the afternoon or during the summer months, and relatively cooler temperatures, such as during the evening or during the winter months. As the ambient temperature rises and falls, the temperature of the gas 80, as well as the temperature in the forward wheel space 26, may be subject to corresponding temperature variations. Further, the pressure of the gas 80 may vary inversely to the varying temperature of the gas 80.

Thus, as the ambient temperature rises, raising the temperature of the gas 80 and the forward wheel space 26 and necessitating cooling of the forward wheel space 26, the pressure of the gas 80 may decrease. This decrease in the pressure of the gas 80 may move the valve 36 to the open position and allow relatively cooler gas 80 to flow through the passage 34. The gas 80 may, in exemplary embodiments, flow from the compressor discharge plenum 20 through the passage 34 into the forward wheel space 26, cooling the forward wheel space 26.

Further, as the ambient temperature falls, lowering the temperature of the gas 80 and the forward wheel space 26 such that cooling of the forward wheel space 26 is no longer required, the pressure of the gas 80 may increase. This increase in the pressure of the gas 80 may move the valve 36 to the closed position and prevent gas 80 from flowing through the passage 34, thus preventing wasteful diversion of portions of the gas 80 from the compressor discharge plenum 20 and increasing the output and efficiency of the gas turbine system 10 during periods when cooling of the forward wheel space 26 is not necessary.

Thus, it should be understood that the plug 30 of the present disclosure is a self-operating dynamic plug, requiring no manual intervention after installation during normal operating conditions.

In exemplary embodiments, as shown in FIGS. 2 through 10 and described below, the valve 36 may be biased towards the open position. For example, in certain exemplary embodiments, the plug 30 may include a spring component 40 in communication with the valve 36. The spring component 40 may generally apply a spring force to the valve 36 such that the valve 36 is biased towards the open position. In alternative exemplary embodiments, the valve 36 may be biased towards the open position by the weight of the valve 36, or by any other suitable application of force to cause a bias towards the open position. It should also be understood that, in certain alternative embodiments, the valve 36 may be biased towards the closed position.

It should be understood that each plug 30 may include a single pressure-actuated valve 36 or a plurality of pressure actuated valves 36. For example, in various embodiments, the passage 34 defined in the housing 32 may include a number of branches, as discussed above, and a valve 36 may be disposed in each branch of the passage 34. Alternatively, the plug 30 may include more than one passage 34, and a valve 36 may be disposed in each passage 34. Alternatively, the plug 30 may include a singular passage 34, and a plurality of valves may be disposed in the passage 34.

Further, it should be understood that more than one plug 30, such as a plurality of plugs 30, may be disposed on the temperature boundary 60. In exemplary embodiments, for example, a plurality of plugs 30 may be disposed in the compressor discharge case 22.

FIGS. 2 through 4 show one embodiment of the plug 30 of the present disclosure. As shown, the valve 36 of this embodiment is movable between the open position (see FIGS. 2 and 3) and the closed position (see FIG. 4) along a generally linear horizontal axis. Further, the plug 30 includes a spring component 40 providing a spring force to bias the plug 30 towards the open position. Additionally, a plurality of stops 42 may be disposed in the plug 30. The stops 42 may be positioned to align the valve 36 in the open position such that the passage 34 and the valve bore 38 are aligned and in fluid communication. Additionally, in some embodiments, stops 42 may be positioned to align the valve 36 in the closed position such that the valve 36 properly seals the passage 34 to prevent gas 80 from flowing therethrough. As discussed above, when the valve 36 is in the open position, the force 50 applied to the valve 36 by the pressure of the gas 80 may be relatively lower, such as when the temperature of the gas 80 is relatively higher, as shown in FIGS. 2 and 3. As the temperature of the gas 80 drops, however, the force 50 applied to the valve 36 by the pressure of the gas 80 may correspondingly increase, thus causing the valve 36 to move from the open position to the closed position, as shown in FIG. 4. As the temperature of the gas 80 increases, the force 50 applied to the valve 36 by the pressure of the gas 80 may correspondingly drop, thus causing the valve 36 to move from the closed position back to the open position.

FIGS. 5 and 6 show another embodiment of the plug 30 of the present disclosure. As shown, the valve 36 of this embodiment is movable between the open position (see FIG. 5) and the closed position (see FIG. 6) along a generally linear vertical axis. Further, the plug 30 includes a spring component 40 providing a spring force to bias the plug 30 towards the open position. Additionally, stops 42 may be disposed in the plug 30. The stops 42 may be positioned to align the valve 36 in the open position such that the passage 34 and the valve bore 38 are aligned and in fluid communication. Additionally, in some embodiments, stops 42 may be positioned to align the valve 36 in the closed position such that the valve 36 properly seals the passage 34 to prevent gas 80 from flowing therethrough. As discussed above, when the valve 36 is in the open position, the force 50 applied to the valve 36 by the pressure of the gas 80 may be relatively lower, such as when the temperature of the gas 80 is relatively higher, as shown in FIG. 5. As the temperature of the gas 80 drops, however, the force 50 applied to the valve 36 by the pressure of the gas 80 may correspondingly increase, thus causing the valve 36 to move from the open position to the closed position, as shown in FIG. 6. As the temperature of the gas 80 increases, the force 50 applied to the valve 36 by the pressure of the gas 80 may correspondingly drop, thus causing the valve 36 to move from the closed position back to the open position.

FIGS. 7 and 8 show another embodiment of the plug 30 of the present disclosure. As shown, the valve 36 of this embodiment is pivotable between the open position (see FIG. 7) and the closed position (see FIG. 8) about a pivot point 44. Further, the plug 30 includes a spring component 40 providing a spring force to bias the plug 30 towards the open position. Additionally, stops 42 may be disposed in the plug 30. The stops 42 may be positioned to align the valve 36 in the closed position such that the valve 36 properly seals the passage 34 to prevent gas 80 from flowing therethrough. Additionally, in some embodiments, stops 42 may be positioned to align the valve 36 in the open position such that the passage 34 and the valve bore 38 are aligned and in fluid communication. As discussed above, when the valve 36 is in the open position, the force 50 applied to the valve 36 by the pressure of the gas 80 may be relatively lower, such as when the temperature of the gas 80 is relatively higher, as shown in FIG. 7. As the temperature of the gas 80 drops, however, the force 50 applied to the valve 36 by the pressure of the gas 80 may correspondingly increase, thus causing the valve 36 to move from the open position to the closed position, as shown in FIG. 8. As the temperature of the gas 80 increases, the force 50 applied to the valve 36 by the pressure of the gas 80 may correspondingly drop, thus causing the valve 36 to move from the closed position back to the open position.

FIGS. 9 and 10 show another embodiment of the plug 30 of the present disclosure. As shown, the valve 36 of this embodiment is movable between the open position (see FIG. 9) and the closed position (see FIG. 10) along a generally linear vertical axis. In this embodiment, however, the plug 30 is biased toward the open position by the weight of the valve 36. Additionally, stops 42 may be disposed in the plug 30. Several of the stops 42 may be positioned to align the valve 36 in the open position such that the passage 34 and the valve bore 38 are aligned and in fluid communication. Other stops 42 may be positioned to align the valve 36 in the closed position such that the valve 36 properly seals the passage 34 to prevent gas 80 from flowing therethrough. As discussed above, when the valve 36 is in the open position, the force 50 applied to the valve 36 by the pressure of the gas 80 may be relatively lower, such as when the temperature of the gas 80 is relatively higher, as shown in FIG. 9. As the temperature of the gas 80 drops, however, the force 50 applied to the valve 36 by the pressure of the gas 80 may correspondingly increase, thus causing the valve 36 to move from the open position to the closed position, as shown in FIG. 10. As the temperature of the gas 80 increases, the force 50 applied to the valve 36 by the pressure of the gas 80 may correspondingly drop, thus causing the valve 36 to move from the closed position back to the open position.

It should be understood that the stiffness of the spring component 40, the weight, size and surface area of the valves 36, the size and length of the passages 34 and valve bores 38, and the alignment of the stops 42 may be calibrated such that the plug 30 properly responds to changes in the pressure of the gas 80, and such that the valves 36 move from the open position to the closed position as the pressure of the gas 80 increases and move from the closed position to the open position as the pressure of the gas 80 decreases.

The plug 30 of the present disclosure, by including pressure-actuated valves 36 that move between an open position and a closed position, thus provides gas 80 through the temperature boundary 60 only when cooling is required, such as during relatively higher temperature operating conditions. Further, the plug 30 of the present disclosure prevents the wasteful diversion of gas 80 through the temperature boundary 60 when cooling is not required, such as during relatively lower temperature operating conditions. Thus, in exemplary embodiments, the plug 30 of the present disclosure provides for improved efficiency and increased power generation by the gas turbine system 10 of the present disclosure during relatively lower temperature operating conditions while providing for cooling of various components of the gas turbine system 10 during higher temperature operating conditions.

The present disclosure further provides a method for regulating a flow of gas 80 through a temperature boundary 60 in a gas turbine system 10. The method may include, for example, providing at least one plug 30. The plug 30 may include a housing 32 disposed on a temperature boundary 60 in the gas turbine system 10, the housing 32 defining a passage 34 for flowing gas 80 therethrough, as discussed above. The housing 32 may further include at least one pressure-actuated valve 36 disposed in the passage 34 and movable between an open position and a closed position, as discussed above.

The method may further include the steps of actuating the valve 36 towards the open position to allow the gas 80 to flow therethrough when the pressure of the gas 80 decreases, and actuating the valve 36 towards the closed position to prevent the gas 80 from flowing therethrough when the pressure of the gas 80 increases. For example, as discussed above, the at least one pressure-actuated valve 36 moves from the open position to the closed position as the pressure of the gas 80 increases and moves from the closed position to the open position as the pressure of the gas 80 decreases.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine system comprising:
   a compressor section for compressing gas, the compressor section including a compressor discharge plenum at least partially defined by a compressor discharge case;
   a combustor section configured to accept compressed gas from the compressor and combust the compressed gas, generating a hot gas;
   a turbine section configured to accept the hot gas, the turbine section including a plurality of rotor wheels and a forward wheel space, the forward wheel space at least partially defined by the compressor discharge case; and
   at least one plug disposed in the compressor discharge case, the at least one plug comprising a housing and at least one pressure-actuated valve, the housing defining a passage extending through the compressor discharge case for flowing a portion of the compressed gas from the compressor discharge plenum to the forward wheel space, the at least one pressure-actuated valve disposed in the passage and movable between an open position and a closed position,
   wherein the at least one pressure-actuated valve moves from the open position to the closed position as the pressure of the portion of the compressed gas increases and moves from the closed position to the open position as the pressure of the portion of the compressed gas decreases,
   wherein the at least one pressure-actuated valve in the closed position prevents the portion of the compressed gas from flowing through the passage, and
   wherein the at least one pressure-actuated valve in the open position allows the portion of the compressed gas to flow from the compressor discharge plenum through the passage and into the forward wheel space, cooling the forward wheel space.

2. The gas turbine system of claim 1, wherein the at least one pressure-actuated valve is biased towards the open position.

3. The gas turbine system of claim 2, wherein the bias is caused by a spring force.

4. The gas turbine system of claim 2, wherein the bias is caused by the weight of the at least one pressure-actuated valve.

5. The gas turbine system of claim 1, wherein the at least one pressure-actuated valve is a plurality of pressure-actuated valves.

6. The gas turbine system of claim 1, wherein the at least one plug is a plurality of plugs.

7. A method for regulating a flow of gas in a gas turbine system, the gas turbine system comprising a compressor section for compressing gas which comprises a compressor discharge plenum at least partially defined by a compressor discharge case, a combustor section, and a turbine section which comprises a plurality of rotor wheels and a forward wheel space, the forward wheel space at least partially defined by the compressor discharge case, the method comprising:
   providing at least one plug, the plug comprising a housing disposed on a temperature boundary in the gas turbine system, the housing defining a passage extending through the compressor discharge case for flowing a portion of the compressed gas from the compressor discharge plenum to the forward wheel space, and at least one pressure-actuated valve disposed in the passage and movable between an open position and a closed position;
   actuating the valve towards the open position to allow the portion of the compressed gas to flow from the compressor discharge plenum through the passage and into the forward wheel space when the pressure of the portion of the compressed gas decreases; and
   actuating the valve towards the closed position to prevent the portion of the compressed gas from flowing through the passage when the pressure of the portion of the compressed gas increases.

8. The method of claim 7, wherein the temperature boundary is defined by a compressor discharge case.

9. The method of claim 7, wherein the at least one pressure-actuated valve is biased towards the open position.

10. The gas turbine system of claim 1, wherein the at least one pressure-actuated valve is movable along a generally linear vertical axis.

11. The gas turbine system of claim 1, wherein the at least one pressure-actuated valve is movable along a generally linear horizontal axis.

12. The gas turbine system of claim 1, wherein the at least one pressure-actuated valve is pivotable between the open position and the closed position.

* * * * *